United States Patent [19]

Kluger

[11] 4,362,856
[45] Dec. 7, 1982

[54] POLY-(-2-AMINOALKYL)POLYAMINES

[75] Inventor: Edward W. Kluger, Pauline, S.C.

[73] Assignee: Milliken Research Corporation, Spartanburg, S.C.

[21] Appl. No.: 302,931

[22] Filed: Sep. 16, 1981

[51] Int. Cl.³ .................... C08G 59/50; C07C 93/04
[52] U.S. Cl. .................... 528/111; 528/407; 564/495; 564/504; 564/505
[58] Field of Search .................... 528/107, 111, 407; 564/495, 504, 505

[56] References Cited

U.S. PATENT DOCUMENTS

| | | | |
|---|---|---|---|
| 3,306,809 | 2/1967 | Williamson et al. | 528/111 X |
| 3,316,185 | 4/1967 | Reinking | 528/111 |
| 3,380,881 | 4/1968 | Williamson et al. | 528/111 X |
| 3,799,986 | 3/1974 | Poppelsdorf | 564/505 X |

Primary Examiner—Earl A. Nielsen
Attorney, Agent, or Firm—H. William Petry; Terry T. Moyer

[57] ABSTRACT

Poly-(2-aminoalkyl)polyamine compounds are provided having the following formula:

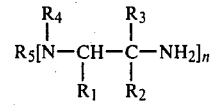

wherein:

n is an integer of from 2 to about 12;

$R_1$ is selected from H and an alkyl group containing from 1 to about 10 carbon atoms;

$R_2$ and $R_3$ are each independently selected from H and a lower alkyl group containing from 1 to about 6 carbon atoms;

$R_4$ is selected from H and

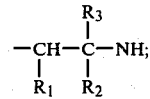

and $R_5$ is selected from an amine terminated polyol moiety having a molecular weight of from about 150 to about 5,000, from about 2 to about 80 ether linkages, and a valence of from about 2 to about 12.

17 Claims, No Drawings

POLY-(-2-AMINOALKYL)POLYAMINES

The present invention relates to poly-(-2-aminoalkyl)-polyamine compounds, and to methods for curing epoxy resins wherein poly-(-2-aminoalkyl)polyamine compounds are employed as a curing agent. The present invention also relates to epoxy resin compositions containing poly-(-2-aminoalkyl)polyamine compounds as epoxy curing agents.

Epoxy resins were first introduced commercially in the United States in about 1950 and since then their use has grown rapidly. Epoxy resins may be broadly defined as resinous intermediate materials which are characterized by the presence of the epoxy group.

In general, epoxy resins are not used by themselves but rather they require the addition of a curing agent or hardener to convert them into a thermoset material. Epoxy resins have gained wide acceptance in structural applications and in protective coatings because of their generally excellent toughness, adhesion, chemical resistance, and electrical properties. The combination of these properties is generally not found in any other single plastic material.

A relatively large number of chemical reagents are available or known to have utility as curing agents or hardeners which may be added to epoxy resins to convert them to thermoset materials. It is also known that in the curing process both the epoxy and the hydroxyl groups of the resin may be involved. Curing agents are available whereby curing may be accomplished at room temperature or upon heating. Curing may take place in general either by a coupling or addition process, or by catalytic polymerization.

The known curing agents or hardeners for epoxy resins fall into three categories: (1) the acidic type, e.g., acid anhydrides; (2) aldehyde condensation products, e.g., phenol-urea, and melamine-formaldehyde resins; and (3) amine type, e.g., aliphatic and aromatic amines, polyamides, tertiary amines, and amine adducts. The novel poly-(-2-aminoalkyl)polyamine compounds of the present invention may be employed as the third type, namely the amine type, of epoxy curing agent.

The poly-(-2-aminoalkyl)polyamine compounds of the present invention may be represented by the following structural formula:

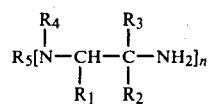

wherein:
n is an integer of from 3 to about 12;
$R_1$ is selected from H and an alkyl group containing from 1 to about 10 carbon atoms;
$R_2$ and $R_3$ are each independently selected from H and a lower alkyl group containing from 1 to about 6 carbon atoms;
$R_4$ is selected from H and

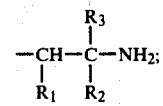

$R_5$ is selected from an amine terminated polyol moiety having a molecular weight of from about 150 to about 5,000, from about 2 to about 80 ether linkages, and a valence of from about 2 to about 12.

The present invention also relates to the use of such compounds as epoxy curing agents and to epoxy resin compositions which contain 100 parts by weight of at least one epoxy resin and from about 15 parts to about 50 parts, preferably about 20 parts to about 30 parts by weight, of the poly-(-2-aminoalkyl)polyamine compounds of the invention. Such cured products have good flexibility, high heat distortion temperatures, and excellent solvent resistance.

The compounds of the present invention may be conveniently prepared in a two-step process. In a first step, an intermediate, poly-(-2-nitroalkyl)polyamine, may be prepared by a condensation reaction of the nitroparaffin with an aldehyde such as formaldehyde and a suitable polyamine according to the following generalized reaction:

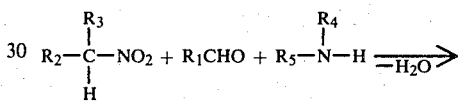

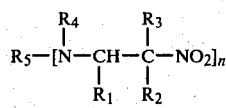

where $R_1$, $R_2$, $R_3$, $R_4$, $R_5$, and n have the values given above.

The nitroparaffin employed as a starting material preferably may be a compound of the formula

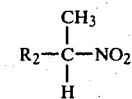

wherein $R_2$ is H or aliphatic groups containing from about 1 to about 9 carbon atoms.

Some commonly available useful nitroparaffins are nitromethane, nitroethane, 1-nitropropane, 2-nitropropane, and high-order nitroparaffins containing up to about 10 carbon atoms. Particularly good results may be obtained using 2-nitropropane, which is preferred.

The polyamines which may be employed as a starting material in the above reaction may be selected from a wide range of compounds, although a preferred class of such compounds are cyanoethylated and reduced polyol compounds having from about 2 to about 8, preferably from about 2 to about 6, hydroxyl groups and a molecular weight of from about 150 to about 5,000. Examples of such compounds include the following:

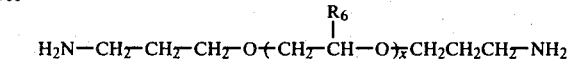

-continued

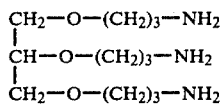

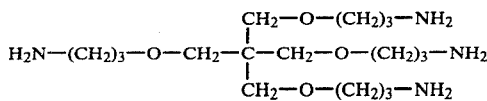

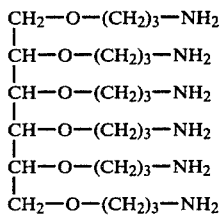

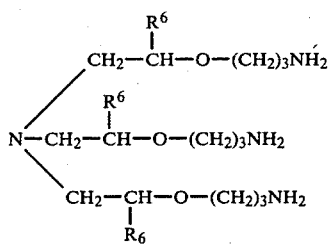

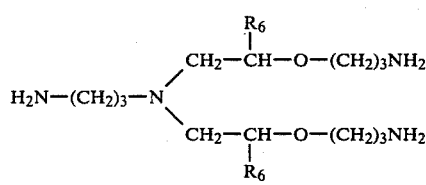

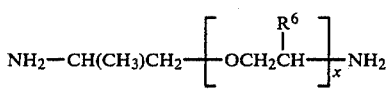

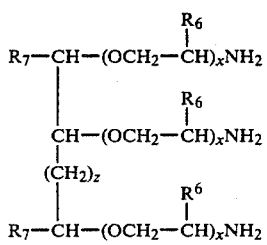

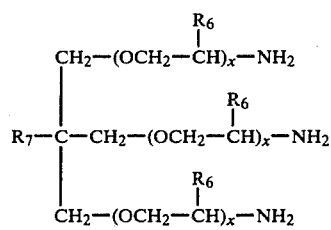

-continued

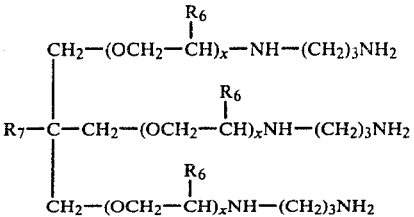

In the above structural formulas x is an integer of from 1 to about 80, z is an integer of from 0–10, $R_6$ is selected from H and $CH_3$ and $R_7$ is selected from H and a lower alkyl group having from 1 to about 6 carbon atoms.

Another preferred class of cyanoethylated and reduced polyglycols within the scope of the present invention are disclosed in U.S. Pat. No. 4,178,427 (incorporated by reference) to Texaco Development Corp. Such compounds may be represented by the following structural formula:

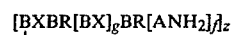
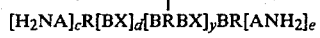

wherein A is a polyoxyalkylene radical containing from about 1 to about 17 oxyalkylene groups wherein each oxyalkylene group contains from 2 to about 4 carbon atoms; B is a polyoxyalkylene amino radical containing from about 1 to 17 oxyalkylene groups wherein each oxyalkylene group contains from 2 to about 4 carbon atoms; R is a hydrocarbon radical having from 2 to 5 carbon atoms forming from 2 to 4 oxycarbon linkages with A and B; X is a C═O radical, a C═S radical or a radical derived from a difunctional isocyanate having two

groups; c and d are from 1 to 3 chosen such that their sum is 2 to 4; e is a number from 1 to 3, f is a number from 1 to 3; g is a number from 1 to 3; y is a number from 0 to about 5; z is a number from 0 to 2.

According to an alternative embodiment, rather than preparing the poly-(-2-nitroalkyl)polyamine by the above described in situ reaction of the nitroparaffin, aldehyde, and polyamine, the poly-(-2-nitroalkyl)polyamines may be prepared in a two-step process by first reacting the aldehyde with the nitroparaffin and then reacting the corresponding nitroalcohol with the polyamine in a separate reaction according to the following sequence:

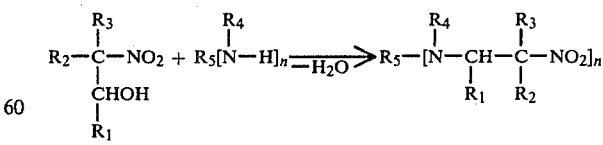

where $R_1$, $R_2$, $R_3$, $R_4$, $R_5$ and n have the values set forth above.

The reaction of nitro-paraffin, formaldehyde, and polyamine may be carried out at a temperature of from about 20° to the boiling point of the mixture. The preferred temperature is from about 75° C. to about 120° C.

The use of a solvent is not critical in the preparation of poly-(-2-nitroalkyl)polyamines; however, the use of a mutual solvent provides homogeneity for all the reactants and facilitates mixing. Lower alcohols, such as methyl alcohol, ethyl alcohol, and isopropyl alcohol, are preferred. At least stoichiometric amounts of 2-nitropropane, aldehyde, and polyamine may be used. Excess aldehyde and polyamine may be used without adverse effects.

The preferred molar ratio is about an equivalent number of moles of nitroparaffin and aldehyde which is equal to the number of primary amino nitrogens in the polyamine or the preferred moles of nitroalcohol used is equal to the number of primary amine nitrogens in the polyamine.

The crude poly-(-2-nitroalkyl)polyamine may then be isolated by any convenient means as, for instance, by solvent extraction and may then be reduced to the poly-(-2-aminoalkyl)polyamine compound with hydrogen and a suitable metal catalyst according to the following equation:

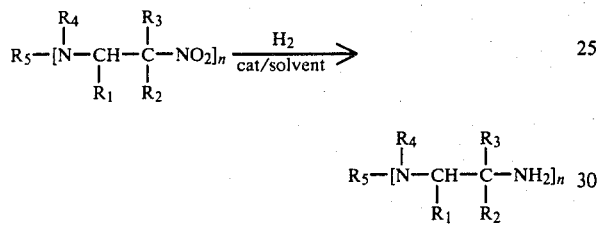

wherein $R_1$, $R_2$, $R_3$, $R_4$, $R_5$ and n are defined above.

The poly-(-2-aminoalkyl)polyamine(s) were prepared by passing hydrogen through a catalyst-containing solution of poly-(-2-nitroalkyl)polyamine in suitable solvent. Solvents include lower weight alcohols such as methyl alcohol, ethyl alcohol, and isopropyl alcohol; ethers such as dioxane; hydrocarbons such as benzene, toluene, xylenes, cyclohexane, and petroleum ether; and mixtures of lower weight alcohols and water such as about equal parts by weight of ethyl alcohol and water. The amount of solvent is not critical. The preferred solvent is methyl alcohol in an amount of about 30 percent to about 80 percent by weight.

Any suitable reduction catalyst may be used to catalyze the reduction of the poly-(-2-nitroalkyl)polyamine to the poly-(-2-aminoalkyl)polyamine compound. Catalysts such as Raney nickel; nickel oxides; finely divided metals such as iron, cobalt, platinum, ruthenium, osmium, and rhodium may be used. Furthermore, metal catalysts supported on pumice, asbestos, kieselkuhr, alumina, silica gel, or charcoal work equally as well. The amount of catalysts used depends on such reaction variables as temperature, pressure, and time, and it can vary from about 0.025 percent to about 15 percent by weight of the poly-(-2-nitroalkyl)polyamine. The preferred catalyst is Raney nickel or supported nickel present from about 0.1 percent to about 15 percent by weight of the poly-(-2-nitroalkyl)polyamine. The poly-(-2-nitroalkyl)polyamine may be reduced at a temperature of from 20° C. to about 120° C., although temperatures of from about 40° C. to about 75° C. may be preferred since they may provide faster reaction times and higher yields of poly-(-2-aminoalkyl)polyamines. During the reduction of poly-(-2-nitroalkyl)polyamine, pressures ranging from about 100 to 3,000 psi, preferably from about 500 to 1,500 psi, of hydrogen may be used.

The process of reducing the poly-(-2-nitroalkyl)polyamines has been described as a batch operation carried out in a high-pressure stirred autoclave; however, other reducing modes may give equally good results. A continuous flow reactor may be used with suspended- or fixed-bed solid catalysts operating at the proper temperature, pressure, and flowrate to give the desired reduction. Most preferably, the desired reduction may be accomplished by incremental addition of the poly-(-2-nitroalkyl)polyamine to a batch-type reactor at the proper described operating conditions.

Substantially pure, low molecular weight polyamines can be separated from the reaction mixture by filtration of the catalyst and insoluble material, distilling off the solvent and thereafter distilling the residue under reduced pressure. Where higher molecular weight polyamines are prepared and where mixtures of non-stoichiometric reaction ratios were used, the resulting products may be more difficult to purify. Therefore, these products may generally be used as obtained without any adverse effects. Reaction product(s) were characterized by GC-mass spectra, IR, proton NMR, Carbon-13 NMR, and elemental analysis.

One particularly important use for the novel compounds of the present invention is their use as epoxy curing agents for polyepoxides. The polyepoxides which can be cured at elevated temperatures using the amino compounds as herein described are those polyepoxides possessing at least two

groups. These groups may be terminal, i.e.,

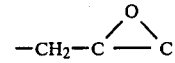

groups, or they may be in an internal position; however, especially desirable results can be obtained when the epoxy groups are terminal. The polyepoxides may be saturated or unsaturated, aliphatic, cycloaliphatic, aromatic, or heterocyclic, and may be substituted such as with hydroxyl groups, ether radicals, and the like. Further, the polyepoxides can be monomeric or polymeric. Such polyepoxides, and their preparation, are well known in the art.

The curing of the polyepoxides with the above-described polyamine curing agents of the present invention may be accomplished by simply mixing the two components together. While the reaction between the two components may occur slowly at room temperature, improved results can be obtained if the mixture is heated to a temperature of from about 50° C. to about 180° C. for a period of time of from about 1 to about 12 hours and thereafter post-curing the reaction product for an additional period of time from about 1 to about 8 hours at a temperature of from about 140° C. to about 225° C. With a small casting, curing of the reaction mixture can be obtained by heating the reaction mixture for about 2 hours at a temperature of from about 80° C. to about 100° C. and thereafter post-curing the reaction product at a temperature of from about 140° C. to about 225° C. for an additional 2 hours or so.

In curing polyepoxides, it is generally desirable that the polyepoxide be in a mobile condition when the curing agent is added to ensure uniform mixing. If the polyepoxide is extremely viscous or solid at room or casting temperature, the polyepoxide may be heated to reduce the viscosity or a volatile liquid solvent which can escape from the polyepoxide composition containing the novel polyamine curing agent by evaporation before and/or during the curing of such polyepoxide composition can be added to the polyepoxide to reduce its viscosity. Typical of such volatile liquid solvents are ketones, such as acetone, methyl ethyl ketone, and the like; ethers, such as ethyl acetate, butyl acetate, and the like; ether alcohols, such as methyl, ethyl, or butyl ethers of ethylene glycol; and chlorinated hydrocarbons, such as chloroform.

In addition to the use of the polyamine compounds of the present invention as epoxy curing agents, many other uses can readily be envisioned by those skilled in the art. Thus, not only do the compounds of the present invention find utility as epoxy curing agents but such compositions can be employed as oil and fuel adductive intermediates. Further, the polyamines may be employed for the formation of diisocyanate compositions for the incorporation into polyurethane compositions, and the compound may be further reacted to form novel and useful polyamides.

In order to more fully describe the preparation and use of the novel compounds of the present invention, the following examples are given; however, such examples are presented for illustration only and are not be construed as unduly limiting the scope of the present invention. Unless otherwise indicated, all parts and/or percentages given in these examples are by weight.

EXAMPLE 1

In a 1000 cc three necked flask equipped with a mechanical stirrer, thermometer, dropping funnel, and water bath was placed 142 gm (0.50 mole) of 1,2,3,-tris-(-3-aminopropoxy) propane, 129.7 (1.46 mole) of 2-nitropropane, and 129 g, of ethyl alcohol. To this mixture, 111.6 gm of 37.3% formaldehyde solutions (1.39 mole) was added through the dropping funnel over 30 minutes such that the reaction temperature did not exceed 51° C. A reflux condenser was then attached and the reaction mixture was heated to 79°-80° C. with a water bath. After 5½ hours of heating at 79°-80° C. the reaction was cooled. On cooling, the ethyl alcohol, water, and any unreacted starting materials were then distilled away from the product under vacuum (15.20 mmHg) to give a yellow liquid. An IR spectrum of the product indicated the presence of nitro groups. A potentiometric titration of the product with one normal hydrochloric acid resulted in a neutralization equivalent of 5.51 milliequivalents of HCl per one gram of product. The theorectical value was calculated to be 5.43 milliequivalents of HCl per gram of product which is in good agreement with the observed experimental value. This poly-(-2-nitro-2-methylpropyl)-1,2,3-tris-(-3-aminopropoxy)propane was used without further purification.

EXAMPLE 2

In a 1000 cc three necked flask equipped with a mechanical stirrer, thermometer, dropping funnel, and water bath was placed 741 gm (0.37 mole) of a polyoxypropylene diamine of about 2000 molecular weight (sold by Jefferson Chemical under the tradename of Jeffamine D2000), 65.8 gm (0.74 mole) of 2-nitropane and 200 gm of ethyl alcohol. To this mixture 56.6 gm of 37.3% formaldehyde solution (0.74 mole) was added through the dropping funnel over five minutes. A reflux condenser was then attached and the reaction mixture was heated to 80°-83° C. with a water bath. After 5 hours of heating at 80°-83° C. the reaction was cooled. On cooling, the ethyl alcohol was, and any unreacted starting materials were, then distilled away from the product under vacuum (15-20 mmHg) to give a yellow liquid. An IR spectrum of the product indicated the presence of nitro groups. A potentiometric titratron of the product with one normal hydrochloric acid resulted in a neutralization equivalent of 0.86 milliequivalents of HCl per one gram of product. The theoretical value was calculated to be 0.91 milliequivalents of HCl per gram of product which is in good agreement with the observed experiment value.

EXAMPLE 3

In a 1000 cc three necked flask equipped with a mechanical stirrer, thermometer, dropping funnel, and water bath was placed 110 gm (0.50 mole) of bis-(-3-aminopropyl)diethylene glycol, 129.7 (1.46 mole) of 2-nitropropane, and 129 gm of ethyl alcohol to this mixture 111.6 gm of 37.3% formaldehyde solution (1.39 mole) was added through the dropping funnel over 30 minutes such that the reaction temperature did not exceed 51° C. A reflux condenser was then attached and the reaction mixture was heated to 79°-80° C. with a water bath. After 5½ hours of heating at 79°-80° C. the reaction was cooled. On cooling, the ethyl alcohol, water, and any unreacted starting materials were then distilled away from the product under vacuum (15.20 mmHg) to give a yellow liquid. An IR spectrum of the product indicated the presence of nitro groups. The poly-(-2-nitro-2-methylpropyl)-bis-(-3-aminopropyl)-diethylene glycol was used without further purification.

EXAMPLE 4

In a two liter stirred autoclave was charged 606 gm of isopropyl alcohol, 190 gm of poly-(-2-nitro-2-methylpropyl)-1,2,3-tris-(-3-aminopropoxy)propane prepared in example #1, 12.5 gm of 40% aqueous, methylamine and 50 gm of wet Raney nickel #28 catalyst. The autoclave was sealed and pressure checked to 2000 psi for leaks. Afterwards the pressure was then adjusted to 1000 psi with hydrogen gas and the autoclave was then heated. On heating, rapid hydrogen up-take was noted with an initial exotherm. After the exotherm ended the reaction contents were then post-heated at 100°-105° C. and 1500 psi for an additional 30 minutes. The autoclave was cooled and the contents were emptied. The methylamine, isopropyl alcohol, and water were removed from the product under vacuum (15 to 30 mmHg) to give a colorless liquid. This colorless liquid was stripped further under higher vacuum (0.5 to 2.0 mmHg) to remove any other low boiling impurities present. An IR spectrum of the product indicated that all the nitro groups had been reduced. A potentiometric titration of the product with one normal hydrochloric acid resulted in a neutralization equivalent of 11.78 milliequivalents of HCl per one gram of product. The theoretical value was calculated to be 11.12 milliequivalent of HCl per gram of product which is in good agreement with the observed experimental value. The poly-(-2-amino-2-methylpropyl)-1,2,3-tris-(-3-aminopropoxy)-propane was used without further purification.

EXAMPLE 5

In a two liter stirred autoclave was charged 500 gm of methyl alcohol, 12.5 gm of 40% aqueous methyl amine, 517.5 gm of the poly-(-2-nitro-2-methylpropyl)polyamine prepared in example 2, and 30 gm of wet Raney nickel #28 catalyst. The autoclave was sealed and pressure checked to 2000 psi for leaks. Afterwards the pressure was then adjusted to 1000 psi with hydrogen gas and the autoclave was then heated. On heating rapid hydrogen up-take was noted with an initial exotherm. After the exotherm ended the reaction contents were then post-heated at 100°–105° C. for an additional 60 minutes. The autoclave was cooled and the contents were emptied. The methylamine, methyl alcohol, and water were removed from the product under vacuum (15 to 30 mmHg) to give a colorless liquid. This colorless liquid was stripped further under higher vacuum (0.5 to 2.0 mmHg) to remove any other low boiling impurities present. An IR spectrum of the product indicated that all the nitro groups had been reduced. A potentiometric titration of the product with one normal hydrochloric acid resulted in a neutralization equivalent of 0.94 milliequivalents of HCl per one gram of product. The theoretical value was calculated to be 0.93 milliequivalents of HCl per gram of product which is in excellent agreement with the observed experimental value. This poly-(-2-nitro-2-methylpropyl)polyamine was used without further purification.

EXAMPLE 6

In a two liter stirred autoclave was charged 606 gm of isopropyl alcohol 150 gm of poly-(-2-nitro-2-methylpropyl)-bis-(-3-aminopropyl)diethylene glycol prepared in example 3, 12.5 gm of 40% aqueous methylamine, and 40 gm of wet Raney nickel #28 catalyst. The autoclave was sealed and pressure checked to 2000 psi for leaks. Afterwards the pressure was then adjusted to 1000 psi with hydrogen gas and the autoclave was then heated. On heating rapid hydrogen up-take was noted with an initial exotherm. After the exotherm ended the reaction contents were then post-heated at 100°–105° C. and 1500 psi for an additional 30 minutes. The autoclave was cooled and the contents were emptied. The methylamine, isopropyl alcohol, and water were removed from the product under vacuum (15 to 30 mmHg) to give a colorless liquid. This colorless liquid was stripped further under higher vacuum (0.5 to 2.0 mmHg) to remove any other low boiling impurities present. An IR spectrum of the product indicated that all the nitro groups had been reduced. The poly-(-2-amino-2-methylpropyl)-bis-3-aminopropyl)diethylene glycol prepared in example 3 was used without further purification.

EXAMPLE 7

To four beakers each containing 100 parts of epoxy resin based on diglycidyl ether of bisphenol A (n=0.2, WPE=185–195) were added the corresponding parts of 1,2,3-tris-(-3-aminopropoxy)propane: 22.9 parts, 23.4 parts, 23.9 parts, and 24.4 parts. After mixing each beaker thoroughly for 2 minutes and centrifuging at a speed of 3000 rpm, these resin mixtures were placed in an aluminum mold and were cured for 2 hours at 80° C. and for another 2 hours at 150° C. The crosslinked products had glass transition temperatures measured with a differential scanning calorimeter (Perkin Elmer Model DSC-2) as are summarized in the table below.

| GLASS TRANSITION TEMPERATURE FOR 1,2,3-TRIS-(3-AMINOPROPOXY)PROPANE | | |
|---|---|---|
| ENTRY | PHR | Tg(°C.) |
| 1 | 22.9 | 100.4 |
| 2 | 23.4 | 105.4 |
| 3 | 23.9 | 106.4 |
| 4 | 24.4 | 104.9 |

EXAMPLE 8

A 5 PHR study was done with poly-(-2-amino-2-methylpropyl)-1,2,3-tris-(-3-aminopropoxy)propane of Example 4 with diglycidyl ether of bisphenol A (n=0.2, WPE=195). After mixing each sample thoroughly for 2 minutes and centrifuging at a speed of 3000 rpm, these resin mixtures were placed in an aluminum mold and were cured for 2 hours at 80° C. The crosslinked products had maximum glass transition temperatures measured with a differential scanning calorimeter (Perkin Elmer model DSC-2) as are summarized in Table 2 below.

TABLE 2

| GLASS TRANSITION TEMPERATURE FOR POLY-(2-AMINO-2-METHYLPROPYL)-1,2,3-TRIS-(-3-AMINOPROPOXY) PROPANE OF EXAMPLE 4 | | |
|---|---|---|
| ENTRY | PHR | Tg(°C.) |
| 1 | 25.3 | 117.4 |
| 2 | 26.3 | 123.4 |
| 3 | 27.3 | 129.9 |
| 4 | 28.3 | 127.4 |
| 5 | 29.3 | 125.1 |

The above examples clearly show the preparation of the novel compound(s) of the present invention. Furthermore, example 8 demonstrates the use of poly-(-2-aminoalkyl)polyamines as epoxy curing agents. In addition to the prolonged pot life observed for these novel poly-(-2-aminoalkyl)polyamines, enhanced thermal properties were also observed over the corresponding aliphatic counterparts. Table 2 clearly shows a glass transition temperature about 24° C. higher for the poly-(-2-aminoalkyl)polyamine.

What is claimed is:

1. Poly-(-2-aminoalkyl)polyamine compounds of the formula:

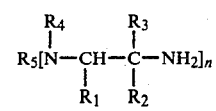

wherein:

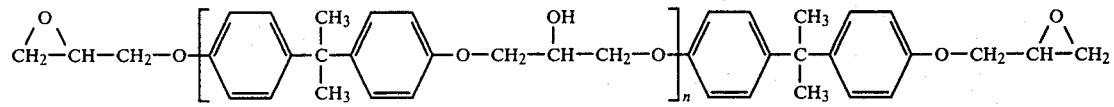

n is an integer of from 3 to about 12;

$R_1$ is selected from H and an alkyl group containing from 1 to about 10 carbon atoms;

$R_2$ and $R_3$ are each independently selected from H and a lower alkyl group containing from 1 to about 6 carbon atoms;

$R_4$ is selected from H and

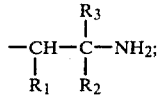

and $R_5$ is selected from an amine terminated polyol moiety having a molecular weight of from about 150 to about 5,000, from about 2 to about 80 ether linkages, and a valence of from about 2 to about 12.

2. The polyamines of claim 1, wherein $R_2$ and $R_3$ are $CH_3$.

3. The polyamines of claim 2, wherein $R_1$ is H.

4. The polyamines of claim 3, wherein $R_4$ is H.

5. The polyamines of claim 1, wherein said polyol moiety is selected from:

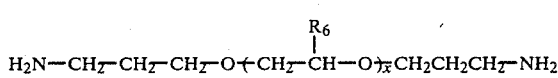

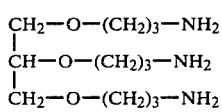

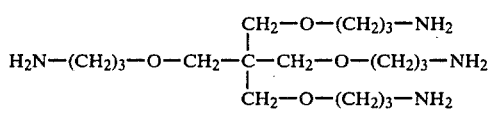

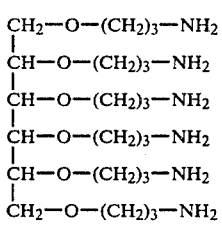

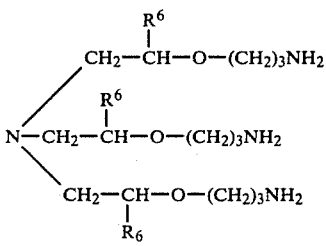

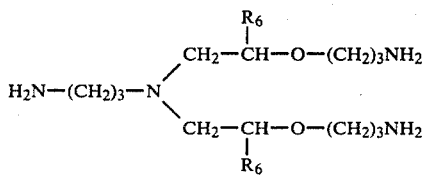

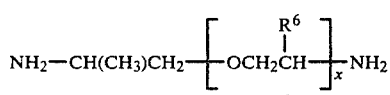

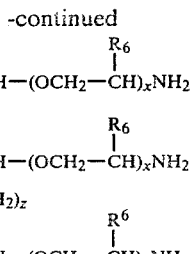

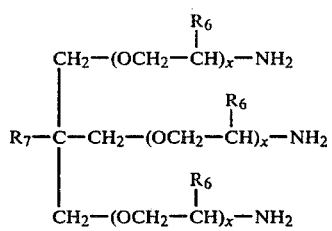

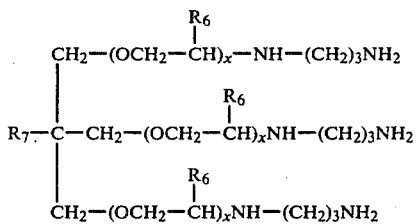

In the above structural formulas x is an integer of from 1 to about 80, z is an integer of from 0–10, $R_6$ is selected from H and $CH_3$ and $R_7$ is selected from H and a lower alkyl group having from 1 to about 6 carbon atoms.

6. The polyamines of claim 1, wherein said polyol moiety is selected from compounds having the following structural formula:

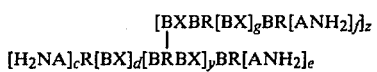

wherein A is a polyoxyalkylene radical containing from about 1 to about 17 oxyalkylene groups wherein each oxyalkylene group contains from 2 to about 4 carbon atoms; B is a polyoxalkylene amino radical containing from about 1 to 17 oxyalkylene groups wherein each oxyalkylene group contains from 2 to about 4 carbon atoms; R is a hydrocarbon radical having from 2 to 5 carbon atoms forming from 2 to 4 oxycarbon linkages with A and B; X is a C=O radical, a C=S radical or a radical derived from a difunctional isocyanate having two

groups; c and d are from 1 to 3 chosen such that their sum is 2 to 4; e is a number from 1 to 3, f is a number from 1 to 3; g is a number from 1 to 3; y is a number from 0 to about 5; z is a number from 0 to 2.

7. Poly-(-2-nitroalkyl)polyamine compounds useful as intermediates in the preparation of poly-(-2-aminoalkyl)polyamines of the formula

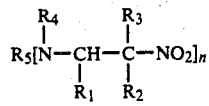

wherein:

n is an integer of from 3 to about 12;

$R_1$ is selected from H and an alkyl group containing from 1 to about 10 carbon atoms;

$R_2$ and $R_3$ are each independently selected from H and a lower alkyl group containing from 1 to about 6 carbon atoms;

$R_4$ is selected from H and

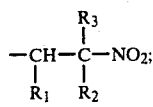

and $R_5$ is selected from an amine terminated polyglycol moiety having a molecular weight of from about 150 to about 5,000, from about 2 to 80 ether linkages, and a valence of from about 2 to about 12.

8. The compounds of claim 7, wherein $R_2$ and $R_3$ are $CH_3$.

9. The compounds of claim 8, wherein $R_4$ is H.

10. The compounds of claim 7, wherein said polyol moiety is selected from

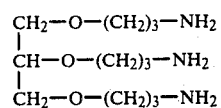

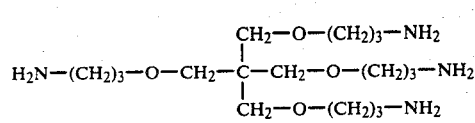

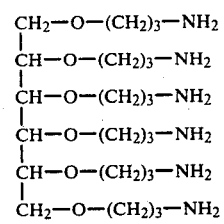

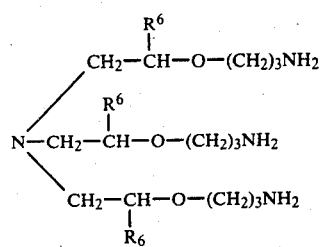

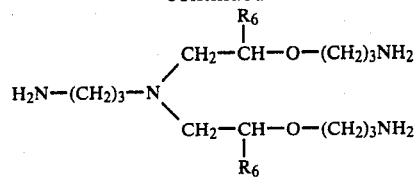

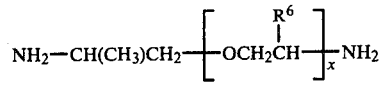

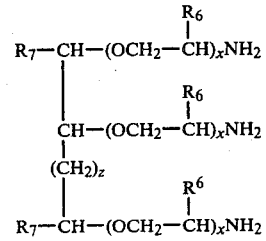

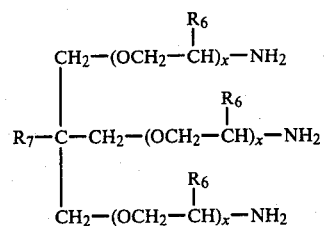

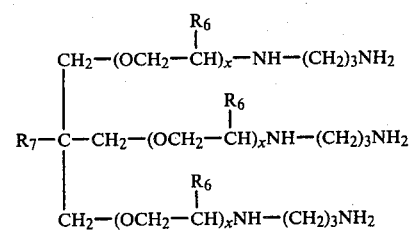

In the above structural formulas x is an integer of from 1 to about 80, z is an integer of from 0–10, $R_6$ is selected from H and $CH_3$ and $R_7$ is selected from H and a lower alkyl group having from 1 to about 6 carbon atoms.

11. The compoounds of claim 7, wherein said polyol moiety is selected from

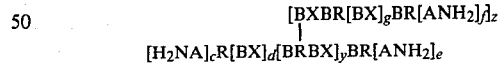

wherein A is a polyoxyalkylene radical containing from about 1 to about 17 oxyalkylene groups wherein each oxyalkylene group contains from 2 to about 4 carbon atoms; B is a polyoxyalkylene amino radical containing from about 1 to 17 oxyalkylene groups wherein each oxyalkylene group contains from 2 to about 4 carbon atoms; R is a hydrocarbon radical having from 2 to 5 carbon atoms forming from 2 to 4 oxycarbon linkages with A and B; X is a C=O radical, a C=S radical of a radical derived from a difunctional isocyanate having two

groups c and d are from 1 to 3 chosen such that their sum is 2 to 4; e is a number from 1 to 3; f is a number from 1 to 3; g is a number from 1 to 3; y is a number from 0 to about 5; z is a number from 0 to 2.

12. An epoxy resin composition comprising an epoxy resin and at least one epoxy resin curing agent of the formula:

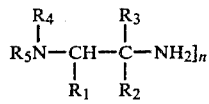

wherein:
n is an integer of from 3 to about 12;
$R_1$ is selected from H and an alkyl group containing from 1 to about 10 carbon atoms;
$R_2$ and $R_3$ are each independently selected from H and a lower alkyl group containing from 1 to about 6 carbon atoms;
$R_4$ is selected from H and

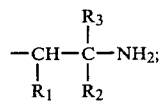

and
$R_5$ is selected from an amine terminated polyol moiety having a molecular weight of from about 150 to about 5,000, from about 2 to about 80 ether linkages, and a valence of from about 2 to about 12.

13. The curable epoxy resin composition of claim 12, wherein said epoxy resin is selected from the polyepoxides having at least two

groups.

14. The epoxy resin composition of claim 13, wherein said

groups are terminal groups.

15. The epoxy resin composition of claim 14, wherein said epoxy resin is a diglycidyl ether of bis-phenol.

16. The epoxy resin composition of claim 12, wherein said epoxy resin curing agent is represented by the formula set forth in claim 4 and wherein $R_1$, $R_2$, $R_3$, and $R_4$ are H.

17. In a method for curing an epoxy resin composition comprising incorporating an epoxy resin curing agent into an epoxy resin and heating the combination of the epoxy resin and the epoxy curing agent, the improvement which comprises said epoxy resin curing agent being represented by the formula:

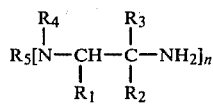

wherein:
n is an integer of from 3 to about 12;
$R_1$ is selected from H and an alkyl group containing from 1 to about 10 carbon atoms;
$R_2$ and $R_3$ are each independently selected from H and a lower alkyl group containing from 1 to about 6 carbon atoms;
$R_4$ is selected from H and

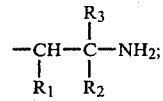

and
$R_5$ is selected from an amine terminated polyol moiety having a molecular weight of from about 150 to about 5,000, from about 2 to about 80 ether linkages, and a valence of from about 2 to 12.

* * * * *